United States Patent Office  3,755,494
Patented Aug. 28, 1973

3,755,494
PROCESS FOR CLARIFYING GUMS
Stephen J. Chinnock, Pearl River, and Paul A. Kirkpatrick, New Rochelle, N.Y., assignors to General Foods Corporation, White Plains, N.Y.
No Drawing. Filed Apr. 2, 1971, Ser. No. 130,834
Int. Cl. C08c *3/00, 17/00*
U.S. Cl. 260—816                                    5 Claims

ABSTRACT OF THE DISCLOSURE

Natural gums and natural gum bases are purified or clarified by heating a suspension of said gums in glycerol to effect separation of the gum into an upper layer and settling precipitous matter into the lower layer of glycerol, whereupon the heated admixture is centrifuged to remove the glycerol and precipitated impurities concurrently from the clarified gums.

BACKGROUND OF THE INVENTION

Field of the invention

This invention relates to the production of clarified or purified gums and gum bases thereof designed for use as an edible chewing gum composition. Commercial chewing gums have traditionally contained admixtures of natural latex gums derived from the sap of trees. These gums include among others chicle, jelutong, gutta kay, gutta hang kang, sorva and lechi caspi. These latex gums being of vegetable origin contain various impurities which deleteriously affect the physical characteristics, taste or storage qualities of the chewing gum in which they are used.

The art recognized practices for removing the various impurities obtained in these gums generally entail heating the gums per se until sufficient fluidity or viscosity is achieved and centrifuging the hot viscous gums to remove precipitous matter therefrom. The volume of gum clarified according to the prior art process is extremely limited; moreover, the process also unduly burdens the equipment employed because of the high temperatures involved and the difficulty of cleaning scorched gummy matter from the equipment after processing.

SUMMARY OF THE INVENTION

It has now been discovered that a novel means for clarifying gum bases is available. Thus, by heating an admixture of glycerol and a natural gum at elevated temperatures, the gum arises to the surface and permits precipitous or gritty matter to settle, thereby enabling rapid clarification of the gum upon centrifuging the admixture at elevated temperatures. The quality, clarity and texture of gums produced according to this process provides a mouth-feel which is an improvement over gums produced according to prior art means known until this time.

The principal object of the invention is to clarify natural gums and natural gum bases by utilizing a heat exchange medium such as glycerol in which the gum is substantially insoluble.

Another object of the invention is to increase the rate as well as the volume of natural gum which may be processed in a given unit of time.

A yet further object is to lower the processing temperatures required for clarification of natural gums and thereby avoid scorching of the gums and volatilization of materials which constitute a desirable taste fraction of the gum.

Other objects and advantages of the invention will become apparent in the description and examples hereinafter-appearing.

DETAILED DESCRIPTION OF THE INVENTION

The process of clarifying natural gums and bases formed therefrom according to the concept of this invention essentially entail heating a suspension of said gums in glycerol to effect surfacing of the viscous gum and precipitation of solid impurities in the glycerol. The preferred heat exchange medium is glycerol, however, any liquid or combination of liquids having a greater density than the gums, and in which the gums are very slightly soluble, are within the contemplation of the inventive concept; providing only that the heat exchange medium does not materially detract from the organoleptic qualities of the ultimate gum composition. The heating step is conducted on admixtures having about 2 parts by weight of the glycerol to about 1 part by weight of the gum. Significantly, neither the amount of gum nor the quantity of said glycerol are critical to effect the needed separation. Generally, the range of temperature which the gum-glycerol admixture will be subjected to is from about 200° F. to 300° F. Usually the gum begins to melt at around 250° F. and after the melting is completed, the admixture is centrifuged at the aforementioned temperatures, either in batch form or in a double discharge centrifuge to permit continuous clarification.

The invention will now be described by reference to the specific examples.

Example I

Approximately 1 part by weight of sorva gum was added to about 2 parts by weight of glycerol, and the admixture was heated to 300° F. At about 250° F. the gum began to melt and formed a liquid layer on top of the glycerol, while the heavier solid impurities separated from the gum and settled on the bottom of the heating vessel. Moreover, there was no burning or scorching of the gum.

Next, the layered admixture was fed into a double discharge heated (300° F.) centrifuge (Sharples High Temperature Super Centrifuge) bowl which was spun at between about 4,000 to 27,000 revolutions per minute. The centrifugal speed was gradually reduced and was allowed to cool while spinning. Upon stoppage the gum (light phase) formed the innermost ring; the glycerol the intermediate ring; and the gritty or precipitous material formed the outer ring on the wall of the bowl.

If desired the heated, layered gum-glycerol admixture may be placed in a colloid mill to develop a stable emulsion of the admixture prior to subjecting it to centrifugation.

It is to be noted that the centrifugation speeds are not critical, and that any speeds which will effect clarification of the admixture by centrifugation will suffice.

Example II

Same as Example I, except that sorva gum was heated to comparable temperatures and similarly centrifuged to remove the precipitous matter. The quality of the gum product was inferior due to some burning or scorching during heating; moreover, removal of the precipitous matter upon cooling occasioned more product or gum loss than in Example I because of adherence of the gum to the solid or precipitous matter.

Example III

Same as Example I, except that a natural gum base [1] was heated in glycerol at 225° F. and centrifugally separated with comparable results.

---

[1] Percent by weight
Natural gum admixture as above (8% of which is chicle) _ 51
Non-glycerol plasticizer _____ 32
Calcium carbonate _____ 12
Microcrystalline wax admixture _____ 5

Because the flowability of this glycerol-gum admixture is swifter than the natural gum base alone, the rate of product or gum base separation utilizing continuous centrifugal separation is 2½ to 3 times that obtained upon separating this gum base per se according to Example II.

Example IV

Same as Example I, except that a mixture of wholly natural gums as disclosed above was employed with comparable results.

Although the invention has been described by reference to various specific examples, it will be understood that the inventive concept is not limited thereto, and that many applications of the inventive concept, to include clarifying synthetic-natural gum admixtures and synthetic gums alone, are contemplated. Thus the scope of the invention is defined in the appended claims below.

What is claimed is:

1. A process for clarifying a latex gum of vegetable origin or a gum base thereof comprising:
   (a) preparing an admixture of the gum or gum base in glycerol;
   (b) heating the admixture to a temperature sufficient to melt the gum or gum base;
   (c) feeding the admixture into a centrifuge;
   (d) centrifuging the admixture to remove the glycerol and precipitous matter from the gum or gum base and form a first layer of clarified gum or gum base and a second layer of glycerol containing the precipitous matter; and
   (e) separating said first layer from said second layer.

2. The process of claim 1 wherein the step of preparing the admixture includes developing a stable emulsion of the gum or gum base and the glycerol.

3. The process of claim 1 wherein the admixture is continuously fed to the centrifuge and the first and second layers are continuously separated and withdrawn from the centrifuge.

4. The process of claim 1 wherein the gum is sorva.

5. The process of claim 1 wherein the gum is a mixture of natural gums.

References Cited
UNITED STATES PATENTS

| | | | |
|---|---|---|---|
| 824,116 | 6/1906 | Heber | 260—816 |
| 931,120 | 8/1909 | Hunicke | 260—816 |
| 1,978,869 | 10/1934 | Smith et al. | 260—816 |
| 1,262,246 | 4/1918 | Peiler | 260—816 |

JOSEPH L. SCHOFER, Primary Examiner

W. F. HAMROCK, Assistant Examiner

U.S. Cl. X.R.
260—819; 99—135